Figure 1:
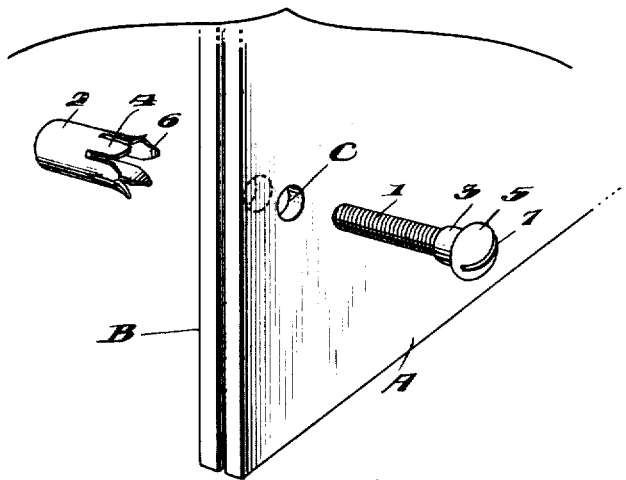

Oct. 23, 1945.  W. J. RITZEL  2,387,468

FASTENER

Filed Jan. 4, 1944

Inventor
WILLIS J. RITZEL,

By Babcock & Babcock
Attorney

Patented Oct. 23, 1945

2,387,468

UNITED STATES PATENT OFFICE 2,387,468

FASTENER

Willis J. Ritzel, Pasadena, Calif.

Application January 4, 1944, Serial No. 516,958

5 Claims. (Cl. 85—1)

This invention relates to self-holding nuts and to the combination thereof with a cooperating bolt or similar fastening member having an enlarged portion and engaging said nut and by rotation relative to said nut causing the latter to move axially of the bolt toward said enlargement or causing relative axial movement between said nut and bolt whereby the distance between said nut and said enlargement is reduced or changed.

The primary object of the invention is to provide a nut which may be applied to the end portion of a bolt and, as thus applied, shoved through an opening in a plate, or through aligned openings in several plates, and which has portions which will snap or spring outwardly, preferably radially of the bolt, as soon as free from the wall of said opening or the walls of said openings to extend radially beyond said wall or walls into rubbing engagement, or substantially so, with the adjacent opposed face of the adjacent plate to hold the nut against turning with the bolt as the latter is rotated from in front of the plate or plates by a screw-driver, wrench or other suitable means, whereby a bolt may be secured in a plate solely by manipulating the bolt from the front of the plate, or whereby several plates may be bolted together from the front of one of said plates where it is not possible to have free access to the space to the rear of the plates such as otherwise would permit the nut to be held by hand or by a wrench or other suitable means.

Other and more limited objects are to provide a nut which will bear with resiliency against the plate through which the bolt passes to hold the nut against turning relative to said plate, the degree of pressure exerted by said nut against said plate varying in accordance with the position of said nut lengthwise of said bolt; to provide resilient means for largely absorbing vibration and aiding in preventing relative rotary movement between said nut and bolt; to provide a combination wherein cutting edges having a convex contour will be presented toward, and cut into, the opposed face portion of the adjacent plate to positively interlock therewith, the degree of the cutting or gouging action depending upon the degree of axial thrust or clamping action between said nut and bolt; and to provide a very simple nut structure which may be treated to give the holding means or fingers temper or resiliency sufficient to insure that the fingers will spread out and remain spread after passing through the hole and yet such that the fingers will touch the plate immediately after passing therethrough and even though such engagement be light will nevertheless serve to hold the nut against turning with the bolt as the same is initially rotated, the degree of pressure applied by the fingers to the plate increasing as the bolt is rotatated to force the nut and enlargement into closer clamping relation.

Figure 6:
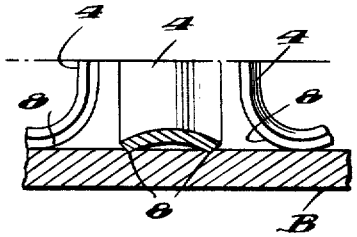
Figure 2:
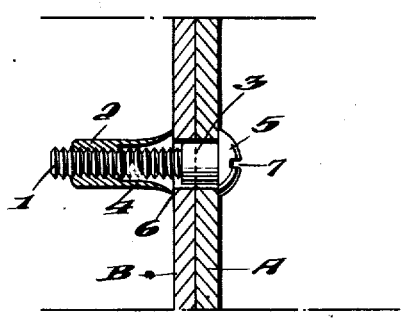
Figure 3:
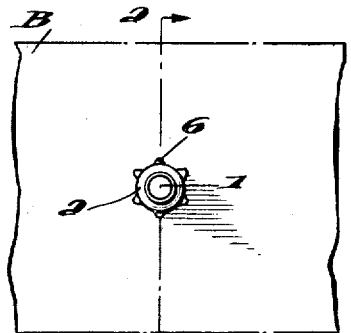
Figure 4:
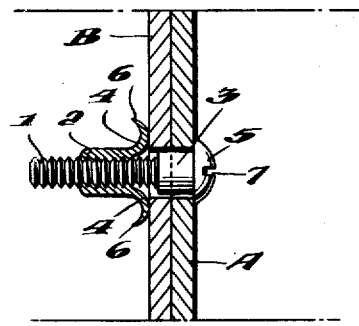
Figure 5:
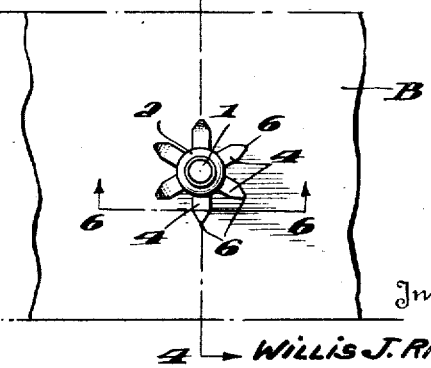

In the accompanying drawing:

Figure 1 represents an "exploded" detail perspective view of a nut embodying my invention in association with a bolt as employed to secure a plurality of plates together, the bolt and nut in this embodiment combining to hold the plates in aligned position and relation after the nut has been shoved through the aligned openings in the plates;

Figure 2, a sectional view on the line 2—2 of Fig. 3, looking in the direction of the arrows;

Figure 3, a rear elevation of the fastening means after the nut has been thrust through the aligned holes and prior to rotation of the bolt to draw the nut toward the head of the bolt or screw and prior to the spreading, by compression, of the fingers of the nut;

Figure 4, a sectional view on the line 4—4 of Fig. 5, looking in the direction of the arrows;

Figure 5, a view similar to Fig. 3 but after the screw or bolt has been rotated to draw the nut to the position shown in Figure 4 to draw the ends of the fingers of the nut into engagement with the opposed face of plate B to cause them to spread radially into substantially the form shown in Fig. 4; and Figure 6, a greatly magnified or enlarged detail sectional view on the line 6—6 of Figure 5, looking in the direction of the arrows, the plate A and bolt I being omitted.

Referring now in detail to the drawing, A designates one plate and B another plate, which plates may extend across and completely close an opening so that access may not be conveniently had to the rear face of plate B distant from plate A.

The above two plates A and B are to be provided or formed with aligned holes, bores or perforations C to receive the bolt or screw I, but which preferably have an internal diameter very slightly in excess of the external diameter of the cylindrical sleeve portion 2 of the nut, so that said nut as screwed upon the end portion of the threaded stem of the bolt or screw I may be thrust through the aligned holes C in the plates A and B until the rear face of the head 5 of the screw I is substantially in engagement with the front face of the plate A, with the enlarged portion or shoulder 3 of the screw 1 substantially centered in the aligned holes C, at which time the nut will have passed completely through the aligned holes C, compressing the fingers 4 of said nut during such passage in order to pass through the plates, and permitting the fingers 4 to spread back to normal position with their free ends or tips 6 flaring radially and by progressive degree toward the head 5 and in light brushing contact with the rear face of the plate B, all as shown in Figure 2. Theoretically, if it be assumed the holes C, shoulder 3, screw threaded stem of the bolt or screw 1 and the cylindrical sleeve portion 2 of the nut are all made of such size and with such precision that the shoulder 3 will engage with the cylindrical walls of the holes C in the plates A and B, such engagement of the shoulder 3 with the walls of the holes C will present the axis of the screw 1 perpendicular to the front and rear faces of the plates A and B and therefore if there be a tight screw engagement of the nut on the bolt 1 the axis of the nut will be perpendicular to the rear face of the plate B and the tips 6 of the fingers 4 of said nut will be disposed all in a single plane parallel to the face of plate B but spaced at all points therefrom, even though by an extremely minute interval.

However, theory is one thing and practice another, the parts are not made with this degree of precision, the shoulder 3 has substantially the same external diameter as the sleeve 2 of the nut, which however, is of slightly less external diameter than the internal diameter of the holes C to permit the nut to pass freely through the holes C, and the nut may fit or screw loosely on the bolt or screw 1; or, in other words, there may be a slight radial play or clearance between them, the cumulative effect of the easy fit of the shoulder 3 in the holes C and of the nut on the bolt or screw 1 being to permit the screw 1 to rock or slant slightly, possibly almost imperceptibly, but still sufficiently so that immediately after the initial insertion of the bolt or screw 1 with the nut applied thereto through the holes 3 some of the tips or free end portions 6 of the fingers 4 will be in direct engagement with the rear face of the plate B, and such engagement will suffice to hold the nut lightly against turning while the screw 1 is given its initial turn through the nut pulling the nut into positive engagement with the plate B and firmly holding the nut against rotation with increasing pressure as the screw is turned home.

The head 5 of the screw or bolt 1 may be formed with a slot 7, or otherwise formed to receive a screw driver or to be received by or otherwise cooperate with a suitable screw-driver or other tool.

The fingers 4 are formed by reducing the thickness of the resilient metal from the thickness of the sleeve portion 2 to the thickness of the rear or base portions of the fingers 4, as shown in Figure 2, slotting the reduced thickness portion to form a plurality of holding fingers 4, a total of six such fingers 4 being shown in the embodiment illustrated, and the extreme tips or free end portions 6 of the fingers 4 will preferably be very thin so that with the flared construction or disposition of the free end portions of the fingers 4 as a unit and as the pressure is applied, the individual free end portions or tips 6 will slide and bend radially outwardly in arcs approximately as illustrated in Figures 4, 5 and 6, exerting increasing pressure against the rear face of the plate B as the spreading action progresses under the pull of the bolt or screw 1.

The individual fingers 4, being simply small segments of the body of the nut and being formed or separated from each other by slots, as well shown in Figures 1 and 6, are arcuate in cross-section at right angles to the axis of the nut, so that as they bend incident to the pull of the screw their inner edges 8 at the point of bending or radial arcing will gouge or cut into the opposed face of the plate B, thereby increasing the locking action between the nut and the plate B substantially in proportion as the power applied in rotating the screw or bolt 1 is increased in the normal tightening up operation.

Due to the fact that these nuts are normally resiliently held or act by their resiliency they are valuable in acting as vibration dampers or in resisting the loosening effects of vibration.

While it is preferred to provide a shoulder 3 substantially of the axial length and external diameter relative to the holes C approximately as shown, still this is not essential or particularly important and such axial length and external diameter may be varied considerably or the shoulder 3 may be omitted entirely or its function may be served in any one of several ways by equivalent known construction or means.

The nut is to be made preferably of metal and preferably of a metal that can be easily fabricated on a large production basis and may be heat treated or otherwise treated to give it the desired varying degrees of flexibility and resiliency according to the acting parts lengthwise of the fingers 4 to meet the desired attributes above set forth.

I claim:

1. A nut having a screw-threaded body portion and a plurality of resilient fingers extending from said body to engage, and be spread by, the adjacent opposed face of a perforated member, in combination with a bolt to extend through said perforation in said member and engage said nut body to draw the same toward said member and force said fingers into contact with said member and thereby deflect, bend and radially outwardly spread said fingers, said bolt carrying positioning means extending into said perforation, said body portion and fingers as a unit being of such external cross-sectional dimensions and of such resiliency as to pass through any perforation that will receive said positioning means, and each finger being arcuate in cross-section and formed with inwardly presented sharp side edges and having a thin lightly flexible resilient pointed end.

2. A nut having a screw-threaded body portion and a plurality of resilient fingers extending from said body to engage, and be spread by, the adjacent opposed face of a perforated member, in combination with a bolt to extend through said perforation in said member and engage said nut body to draw the same toward said member and force said fingers into contact with said member and thereby deflect, bend and radially outwardly spread said fingers, said bolt carrying positioning means extending into said perforation of said member, said body portion and fingers as a unit being of such external cross-sectional dimensions and of such resiliency as to pass through any perforation that will receive said positioning means, and each said finger being arcuate in cross-section and having a lightly flexible resilient free end.

3. A nut having a screw-threaded body portion and a plurality of resilient fingers extending from said body to engage, and be spread by, the adjacent opposed face of a perforated member, in combination with a bolt extending through said perforation in said member and engaging said nut body to draw the same toward said member and force said fingers into contact with said member to thereby deflect, bend and radially outwardly spread said fingers, said bolt carrying positioning means extending in said perforation of said member, said body portion and fingers as a unit being of such external cross-sectional dimensions as to pass through any perforation that will receive said positioning means, and each said finger being formed with an inwardly presented portion to penetrate the surface of said member.

4. A nut having a screw-threaded body portion and a plurality of flexible fingers extending from said body to engage, and be spread by, the adjacent opposed face of a perforated member, in combination with a bolt to extend through said perforation in said member and engage said nut body to draw the same toward said member and force said fingers into contact with said member, said bolt carrying positioning means to extend in said perforation, said body portion being of such external cross-sectional dimensions as to pass through any perforation that will receive said positioning means, and each said finger being arcuate in cross-section and formed with inwardly presented sharp side edges.

5. A nut having a screw-threaded body portion and a plurality of flexible fingers extending from said body to engage, and be spread by, the face of a perforated member, in combination with a bolt to extend through a perforation in such member and engage said nut body to draw the same toward said member and force said fingers in contact with said member, said bolt having a head and said nut body being of an external diameter of less length than the greatest cross-sectional dimension of said head and said fingers as a group being radially compressible to lie within a circle of a diameter less than said greatest cross-sectional dimension of said head, and each said finger being arcuate in cross-section and formed with inwardly presented sharp cutting edges.

WILLIS J. RITZEL.